United States Patent
Jung et al.

(10) Patent No.: US 9,077,510 B2
(45) Date of Patent: Jul. 7, 2015

(54) METHOD FOR SENDING AND RECEIVING SYSTEM INFORMATION IN A WIRELESS COMMUNICATION SYSTEM, AND A SYSTEM INFORMATION SENDING DEVICE AND RECEIVING DEVICE EMPLOYING THE SAME

(75) Inventors: Myungcheul Jung, Seoul (KR); Kibum Kwon, Ansan-si (KR)

(73) Assignee: Pantech Co., Ltd., Seoul (KR)

( * ) Notice: Subject to any disclaimer, the term of this patent is extended or adjusted under 35 U.S.C. 154(b) by 224 days.

(21) Appl. No.: 13/504,908

(22) PCT Filed: Oct. 25, 2010

(86) PCT No.: PCT/KR2010/007316
§ 371 (c)(1),
(2), (4) Date: Apr. 27, 2012

(87) PCT Pub. No.: WO2011/059187
PCT Pub. Date: May 19, 2011

(65) Prior Publication Data
US 2012/0213203 A1    Aug. 23, 2012

(30) Foreign Application Priority Data

Nov. 10, 2009    (KR) ......................... 10-2009-0107920

(51) Int. Cl.
*H04J 11/00*    (2006.01)
*H04W 4/00*    (2009.01)
(Continued)

(52) U.S. Cl.
CPC .............. *H04L 5/0096* (2013.01); *H04L 5/001* (2013.01); *H04W 48/08* (2013.01); *H04W 48/16* (2013.01); *H04W 72/02* (2013.01); *H04W 56/0045* (2013.01)

(58) Field of Classification Search
CPC ....... H04J 3/00; H04W 72/04; H04W 72/042; H04W 36/00; H04W 72/0453; H04L 5/001; H04L 5/0007

USPC ......... 370/329, 330, 468, 336, 254, 255, 256, 370/344, 319; 455/450, 451, 452, 418, 515
See application file for complete search history.

(56) References Cited

U.S. PATENT DOCUMENTS 8,229,412 B2 *    7/2012    Park .............................. 455/418
8,489,105 B2 *    7/2013    Choi .......................... 455/452.1
(Continued)

FOREIGN PATENT DOCUMENTS

| EP | 1489806 | 12/2004 |
|---|---|---|
| KR | 10-0758766 | 9/2007 |
| KR | 10-2008-0064995 | 7/2008 |

OTHER PUBLICATIONS

International Search Report of PCT/KR2010/007316 dated Jul. 29, 2011.
(Continued)

*Primary Examiner* — Hanh N Nguyen
(74) *Attorney, Agent, or Firm* — H.C. Park & Associates, PLC (57) ABSTRACT

The present invention relates to a method for sending and receiving system information about multiple component carriers in a wireless communication system, and to a system information sending and receiving device employing the same. The present invention comprises a configuration wherein one component carrier is used to transmit system information about another component carrier to a terminal. One embodiment of the present invention solves the problems which occur when using a plurality of component carriers such as additional battery consumption and time delays before receiving information, and hence it has the advantages that battery consumption and information receipt delays are reduced.

20 Claims, 8 Drawing Sheets

(51) Int. Cl.
*H04L 5/00* (2006.01)
*H04W 56/00* (2009.01)
*H04W 48/08* (2009.01)
*H04W 48/16* (2009.01)
*H04W 72/02* (2009.01)

(56) References Cited

U.S. PATENT DOCUMENTS

| | | | |
|---|---|---|---|
| 8,526,309 B2* | 9/2013 | Yamada et al. | 370/235 |
| 8,547,927 B2* | 10/2013 | Seo et al. | 370/330 |
| 2004/0253960 A1 | 12/2004 | Nguyen et al. | |
| 2007/0097961 A1 | 5/2007 | Sun et al. | |
| 2008/0085716 A1 | 4/2008 | Chang | |
| 2009/0318177 A1* | 12/2009 | Wang et al. | 455/515 |
| 2010/0227569 A1* | 9/2010 | Bala et al. | 455/73 |
| 2011/0243034 A1* | 10/2011 | Yamada et al. | 370/254 |
| 2012/0195283 A1* | 8/2012 | Kwon et al. | 370/329 |
| 2012/0258721 A1* | 10/2012 | Kwon et al. | 455/450 |
| 2012/0300725 A1* | 11/2012 | Kwon et al. | 370/329 |

OTHER PUBLICATIONS

CMCC, 3GPP TSG RAN WG1 meeting #58bis, R1-094036, "Method to decrease blind decoding attempts in common search space," Miyazaki, Japan, Oct. 12-16, 2009.

Panasonic, 3GPP TSG RAN WG2#68, R2-096489, "System information acquisition at the start of carrier aggregation," Jeju, Korea, Nov. 9-13, 2009.

Catt, 3GPP TSG RAN WG2 meeting #68, R2-096503, "System Information Acquisition and Updating in Carrier Aggregation," Jeju, Korea, Nov. 9-13, 2009.

* cited by examiner

METHOD FOR SENDING AND RECEIVING SYSTEM INFORMATION IN A WIRELESS COMMUNICATION SYSTEM, AND A SYSTEM INFORMATION SENDING DEVICE AND RECEIVING DEVICE EMPLOYING THE SAME

CROSS-REFERENCE TO RELATED APPLICATIONS

This application is the National Stage Entry of International Application No. PCT/KR2010/007316, filed on Oct. 25, 2010, and claims priority from and the benefit of Korean Patent Application No. 10-2009-0107920, filed on Nov. 10, 2009, both of which are incorporated herein by reference for all purposes as if fully set forth herein.

BACKGROUND

1. Field

The present invention relates to a wireless communication system, and more particularly to a method and a device for transmitting/receiving system information to/from a is User Equipment (UE).

2. Discussion of the Background

With the progress of communication systems, consumers such as companies and individuals have used a wide variety of wireless terminals.

In current mobile communication systems such as 3GPP LTE ($3^{rd}$ Generation Partnership Project Long Term Evolution) and LTE-A (LTE Advanced), as a high-speed and high-capacity communication system capable of transmitting and receiving various data such as images and wireless data beyond voice-oriented services, it is required to develop a technology capable of transmitting a large amount of data coming close to that of a wired communication network. In addition, an appropriate error detection scheme in which system performance can be improved by minimizing information loss and increasing system transmission efficiency, becomes an essential element.

Meanwhile, up to the present, differently from a communication system using one carrier in one frequency band, in a wireless communication system which has recently been discussed, a method which enables the use of multiple Component Carriers (CCs), is under discussion.

Meanwhile, generally, in a mobile communication system, a User Equipment (UE) acquires multiple parameters (e.g. the initialization of the UE after power-on, a call connection, etc.) required for the operation of the UE, from System Information (SI) broadcasted by a Base Station (BS). The system information is propagated to all cells in which all UEs can receive the system information through a broadcast channel.

In the case of a communication system using multiple component carriers, each component carrier can serve as one cell. Accordingly, system information of each component carrier must be notified to UEs. Particularly, because system information includes time-varying parameters, it is always required to transmit up-to-date system information to UEs. However, up to the present, no determination has been made for this technology.

SUMMARY

Therefore, an aspect of the present invention is to solve the above-mentioned problems, and to provide a method and a device for efficiently transmitting system information of multiple component carriers to a UE.

An aspect of the present invention is to provide a method and a device, in which a UE effectively receives and acquires system information of multiple component carriers.

An aspect of the present invention is to provide a device and a method, by which system information of multiple component carriers can be transmitted through one component carrier and a UE can acquire up-to-date system information of the multiple component carriers through the one component carrier.

In order to accomplish the above-mentioned objects, in accordance with an aspect of the present invention, there is provided a device for transmitting system information of multiple component carriers, which transmits system information of a component carrier used by the device itself and system information of another component carrier to a user equipment.

In accordance with an aspect of the present invention, there is provided a device for receiving system information of multiple component carriers, which receives and acquires system information of a special component carrier and system information of another component carrier from a device for transmitting system information of the special component carrier through which a current signaling connection is made.

In accordance with an aspect of the present invention, there is provided a method for transmitting and receiving system information of multiple component carriers. The method includes: receiving system information of another component carrier allocated to a user equipment, by a device for transmitting system information of a special cell, through which the user equipment makes a signaling connection among multiple component carriers allocated to the user equipment; and transmitting one or more of the system information of the special cell and the system information of another component carrier to the user equipment, by the device for transmitting the system information of the special cell.

In accordance with another aspect of the present invention, there is provided a method for transmitting system information to a user equipment through multiple component carriers. The method includes: selecting a first component carrier, through which the system information is transmitted and received, by a device for transmitting system information; and transmitting entire system information of a second component carrier or a part of changed system information thereof to the user equipment through the first component carrier, by the device for transmitting the system information.

In accordance with another aspect of the present invention, there is provided a method for receiving system information through multiple component carriers. The method includes: connecting, by a user equipment, to a cell controlled by a device for transmitting system information; and receiving entire system information of a second component carrier or a part of changed system information thereof from the device for transmitting the system information, through a first component carrier, through which system information is transmitted and received.

In accordance with another aspect of the present invention, there is provided a device for transmitting system information to a user equipment through multiple component carriers. The device includes: a controller for performing a control operation so as to select a first component carrier through which the system information is transmitted and received, and so as to transmit entire system information of a second component carrier or a part of changed system information thereof to the user equipment through the first component carrier; and a transmitter for transmitting the entire system information of the second component carrier or the part of the changed system information thereof through the first component carrier.

In accordance with another aspect of the present invention, there is provided a user equipment for receiving system information through multiple component carriers. The user equipment includes: a controller for performing a control operation so as to connect the user equipment to a cell controlled by a device for transmitting system information; and a receiver for receiving entire system information of a second component carrier or a part of changed system information thereof from the device for transmitting the system information through a first component carrier, through which system information is transmitted and received.

DETAILED DESCRIPTION OF THE ILLUSTRATED EMBODIMENTS

Hereinafter, exemplary embodiments of the present invention will be described in detail with reference to the accompanying drawings. It should be noted that in assigning reference numerals to elements in the drawings, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be understood that if it is described in the specification that one component is "connected," "coupled" or "joined" to another component, a third component may be "connected," "coupled," and "joined" between the first and second components, although the first component may be directly connected, coupled or joined to the second component.

Figure 1:
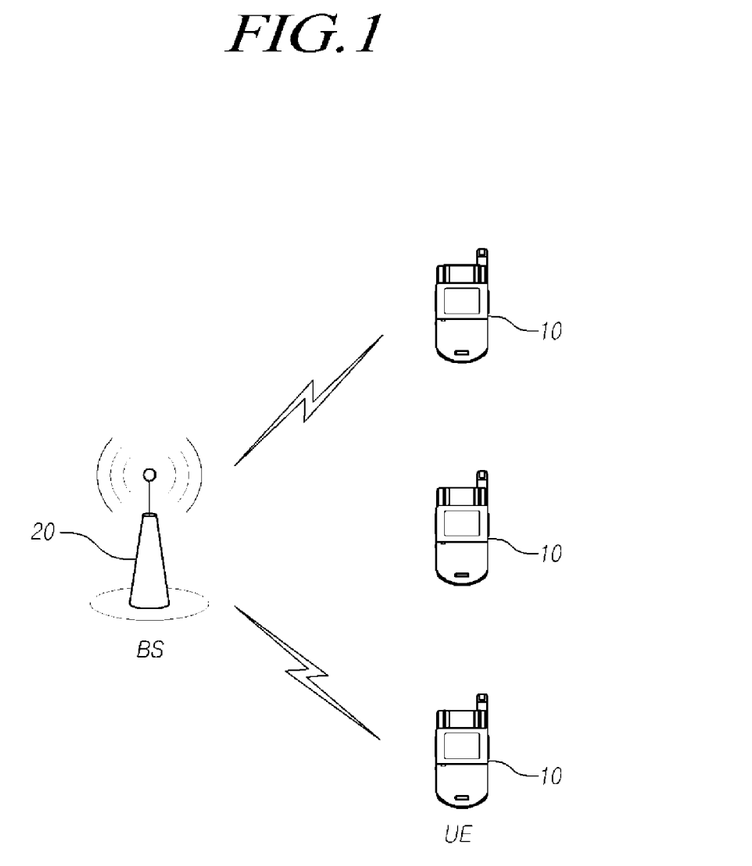
FIG. 1 is a view schematically illustrating a wireless communication system, to which an embodiment of the present invention is applied.

FIG. 1 is a view illustrating a wireless communication system, to which exemplary embodiments of the present invention is applied.

The wireless communication system is widely arranged in order to provide various communication services, such as voice and packet data.

Referring to FIG. 1, the wireless communication system includes a User Equipment (UE) 10 and a Base Station (BS) 20. A technology for transmitting and receiving system information of component carriers according to exemplary embodiments of the present invention which will be described below, is applied to the UE 10 and the BS 20. Such a device and a method for transmitting and receiving system information of multiple component carriers will be described in more detail with reference to FIG. 2 and the accompanying drawings following FIG. 2.

In this specification, the UE 10 has a comprehensive concept implying a user terminal in wireless communication. Accordingly, the UEs should be interpreted as having the concept of including a MS (Mobile Station), a UT (User Terminal), an SS (Subscriber Station), a wireless device, and the like in GSM (Global System for Mobile Communications) as well as UEs (User Equipments) in WCDMA (Wideband Code Division Multiple Access), LTE (Long Term Evolution), HSPA (High Speed Packet Access), etc.

The BS 20 or a cell usually refers to a fixed station communicating with the UE 10, and may be called different terms, such as a Node-B, an eNB (evolved Node-B), a BTS (Base Transceiver System), an AP (Access Point), and a relay node.

Namely, in this specification, the BS 20 or the cell should be interpreted as having a comprehensive meaning indicating a partial area covered by a BSC (Base Station Controller) in CDMA (Code Division Multiple Access) or a Node-B in WCDMA (Wideband Code Division Multiple Access). Accordingly, the BS 20 or the cell has a meaning including various coverage areas such as a mega cell, a macro cell, a micro cell, a pico cell, a femto cell, and a relay node communication range.

In this specification, the UE 10 and the BS 20, which are two transmission and reception subjects used to implement the art or the technical idea described in this specification, are used as a comprehensive meaning, and are not limited by a particularly designated term or word.

There is no limit to multiple access schemes applied to the wireless communication system. For example, use may be made of various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, and OFDM-CDMA.

In this respect, use may be made of a TDD (Time Division Duplex) scheme in which uplink (UL) transmission and downlink (DL) transmission are performed at different times. Otherwise, use may be made of an FDD (Frequency Division Duplex) scheme in which uplink transmission and downlink transmission are performed by using different frequencies.

An embodiment of the present invention may be applied to the allocation of resources in the field of asynchronous wireless communications which have gone through GSM, WCDMA and HSPA, and evolve into LTE (Long Term Evolution) and LTE-advanced, and in the field of synchronous wireless communications which evolve into CDMA, CDMA-2000 and UMB. The present invention should not be interpreted as being limited to or restricted by a particular wireless communication field, and should be interpreted as including all technical fields to which the spirit of the present invention can be applied.

The wireless communication system, to which an exemplary embodiment of the present invention is applied, may support an uplink and/or downlink HARQ (Hybrid Automatic Repeat reQuest), and may use a CQI (Channel Quality Indicator) for link adaptation. Also, multiple access schemes for downlink transmission and uplink transmission may be different from each other. For example, OFDMA (Orthogonal Frequency Division Multiple Access) may be used for downlink transmission, and SC-FDMA (Single Carrier-Frequency Division Multiple Access) may be used for uplink transmission.

Layers of a radio interface protocol between a UE and a network may be divided into a first layer (L1), a second layer (L2), and a third layer (L3) based on three lower layers of an Open Systems Interconnection (OSI) model, which is widely known in a communication system. A physical layer belonging to the first layer provides an information transmission service using a physical channel.

Meanwhile, in an example of the wireless communication system to which an embodiment of the present invention is applied, one radio frame may include 10 subframes, and one subframe may include two slots.

The subframe is a basic unit of data transmission, and downlink or uplink scheduling is performed on a subframe-by-subframe basis. One slot may include multiple OFDM symbols in the time domain, and may include at least one subcarrier in the frequency domain. One slot may include 7 or 6 OFDM symbols.

For example, when one subframe includes two time slots, each time slot may include 7 symbols in the time domain, and may include 12 subcarriers in the frequency domain. Although a time-frequency domain defined by one slot as described above may be called a Resource Block (RB), the present invention is not limited to this configuration.

Meanwhile, in one of currently-used communication systems, one carrier having a predetermined frequency bandwidth (a maximum of 20 MHz) is used. In this wireless communication system, System Information (SI) of a Component Carrier (CC) is transmitted and received through the relevant CC.

However, in a new communication system which has recently been discussed, in order to satisfy required performance, the extension of a bandwidth is under discussion. In order to extend a bandwidth, a unit carrier that the existing communication user equipment can have, is defined as a component carrier, and a method for grouping these component carriers up to a maximum of 5 and using the grouped component carriers is under discussion. It goes without saying that the number of component carriers may change according to a communication system, to which the component carriers are to be applied, and may exceed 5. In this case, the component carrier has the same meaning as a serving cell, and a system according to the present invention may further include the support of one primary serving cell and at least seven subordinate serving cells.

Namely, in LTE-A according to an embodiment of the present invention, the conventional component carriers each having a bandwidth of 20 MHz may be grouped up to a maximum of 5 and the grouped component carriers may be used. Accordingly, the extension of a bandwidth may be achieved in such a manner that the system has a bandwidth up to a maximum of 100 MHz. A technology in which component carriers may first be grouped up to a maximum of 5 and may then be used as described above, is called a carrier aggregation technology. A frequency band that component carriers may be allocated may be continuous, or may be discontinuous.

In relation to the carrier aggregation technology, multiple component carriers may be divided into three types, such as a backwards compatible carrier, a non-backwards compatible carrier and an extension carrier, according to characteristics thereof.

A Backwards compatible Carrier (BC) is a carrier accessible to UEs of all existing LTE releases. The backwards compatible carrier may be operated as a single carrier (stand-alone) or as a part of a carrier aggregation. For Frequency Division Duplex (FDD), backwards compatible carriers may always occur in pairs (i.e. uplink and downlink).

Meanwhile, a Non-Backwards compatible Carrier (NBC) is a carrier which is not accessible to UEs complying with communication systems up to now. The non-backwards compatible carrier may be operated as a single carrier (stand-alone) if the non-backwards compatibility originates from a duplex distance, or otherwise may be operated as a part of a carrier aggregation.

Also, an Extension Carrier (ExC) is a carrier which may not be operated as a single carrier (stand-alone) but must be used as only a part of at least one component carrier set including a stand-alone-capable carrier. The extension carrier is used only for bandwidth extension.

In an environment of the multiple component carriers, a UE may be allocated multiple Component Carriers (CCs), each of which enables the reception of a signal. For an appropriate operation of each allocated component carrier, the UE needs to acquire up-to-date System Information (SI) of each CC.

An embodiment of the present invention relates to the transmission and reception of system information of multiple component carriers, and a device for transmitting system information may simultaneously transmit system information of a component carrier used by the device itself and system information of another component carrier, to a UE.

More specifically, when multiple component carriers are first allocated to one UE and are then used, the UE may transmit and receive system information of a special component carrier (or special cell) and system information of another allocated component carrier through the special component carrier which accesses the UE for signaling.

Meanwhile, the special component carrier may be either a backwards compatible carrier (BC) or a non-backwards compatible carrier (NBC). The BC or NBC may maintain an RRC (Radio Resource Control)_IDLE state or an RRC_CONNECTED state between itself and the UE. Particularly, in the RRC_CONNECTED state, the BC or NBC may be completely connected to the UE. Even when the BC or NBC is in the RRC_IDLE state between itself and the UE, the UE may receive a part of system information, and a state where the UE may be connected to the relevant component carrier (or cell), may be maintained between the BC or NBC and the UE.

System information described in this specification is a message in a Radio Resource Control (RRC) layer. The system information may include a System Information Block (SIB) including general system parameters, a Master Information Block (MIB) including limited parameters which are very often transmitted, a Scheduling Block (SB), etc. However, the present invention is not limited to this configuration.

The MIB may include limited parameters which are very often transmitted, and the SB may include scheduling information on when different system information is transmitted. The MIB is transmitted on a fixed cycle through a Broadcast CHannel (BCH), and the SB and the SIB may be transmitted on a fixed or dynamic cycle through a DownLink Shared Channel (DL-SCH).

Each of the MIB, the SB and the SIB has a size changing according to set information. Each of a BCH and a DL-SCH for transmitting system information has a fixed size. Accordingly, a base station may first appropriately divide each of the MIB, SB and SIB and then transmit the divided MIB, the divided SB and the divided SIB, according to the size of a transmission channel. A UE may receive and recombine all of the divided MIB, the divided SB and the divided SIB.

In order to receive a particular SIB using a dynamic cycle, the UE may continuously receive information through a DL-SCH until it receives all of the particular divided SIB. Otherwise, the UE may receive the divided pieces of the particular SIB by using information on the division and transmission scheduling of the particular SIB included in the SB.

As described above, system information is information essential to be connected through a CC and exchange data. In order to obtain system information of each CC, the UE must receive the system information at a frequency corresponding to the relevant CC.

However, in the case of LTE-A according to an embodiment of the present invention, a communication system using a maximum of 5 CCs must receive information on a maximum of 5 frequency bands, in order to receive system information. Herein, a disadvantage may occur in that it is possible to waste battery resources, the amount of which can be up to five times as much, to this end.

In order to solve this disadvantage, in an exemplary embodiment of the present invention, system information of a CC may be transmitted through another CC.

Figure 2:
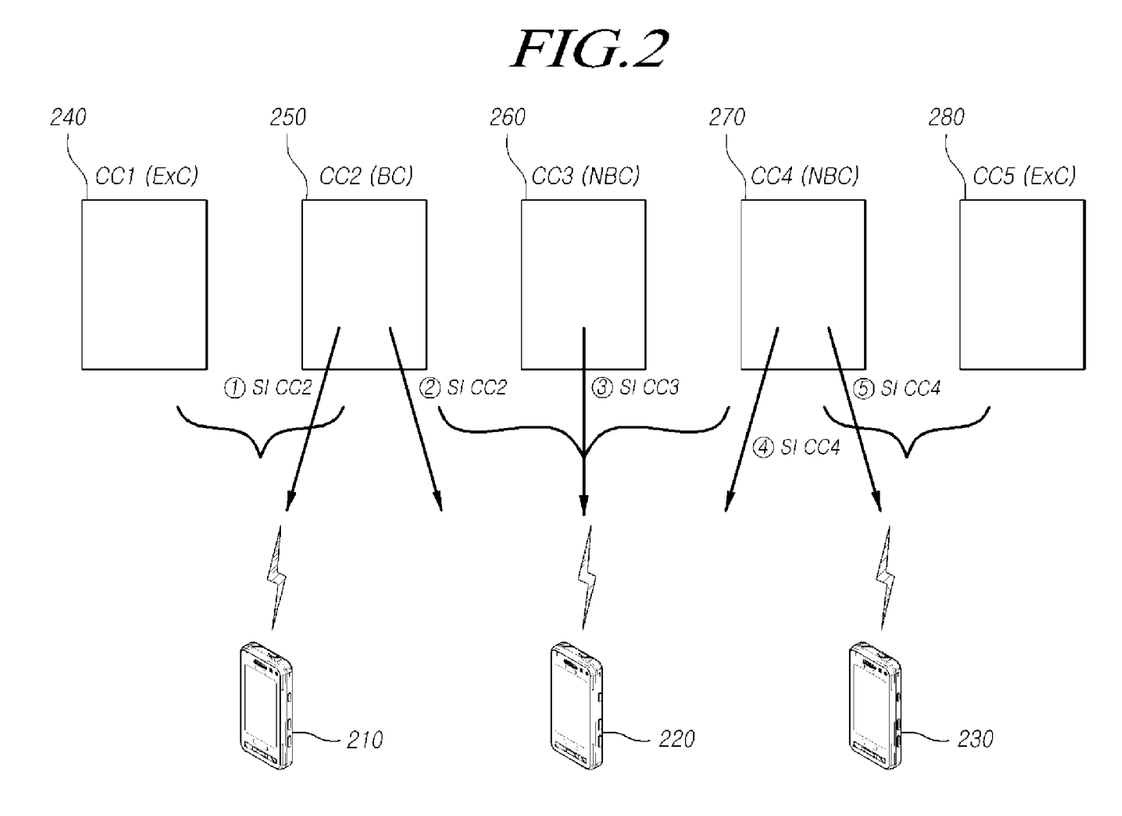
FIG. 2 is a view illustrating an example of a wireless communication system using multiple component carriers, to which an embodiment of the present invention is applied.

FIG. 2 is a view illustrating an example of a wireless communication system using multiple component carriers, to which an embodiment of the present invention is applied.

As shown in FIG. 2, a UE1 210 is in a state where it may transmit data through a CC1 240 and a CC2 250. A UE2 220 is in a state where it may transmit data through a CC2 250, a CC3 260 and a CC4 270. Also, a UE3 230 is in a state where it may transmit data through a CC4 270 and a CC5 280.

In this case, the state where a UE may transmit data, corresponds to a state where the relevant UE may first receive system information (SI) from the relevant CCs and may then transmit data, in order to receive data from CCs that the relevant UE may use.

Meanwhile, it is assumed in FIG. 2 that the CC2 250 is a backwards compatible carrier (BC), each of the CC3 260 and the CC4 270 is a non-backwards compatible carrier (NBC), and each of the CC1 240 and the CC5 280 is an extension carrier (ExC). Namely, each of the CC2 (BC), the CC3 (NBC) and the CC4 (NBC) is a relevant component carrier, through which SI may be transmitted. In contrast, each of the CC1 and the CC5 is a relevant component carrier, through which SI may not be transmitted.

FIG. 2 illustrates a configuration, in which system information of each CC is delivered to a UE only through the relevant CC.

Namely, for example, the UE2 220 uses the CC2 250, the CC3 260 and the CC4 270, and receives and acquires system information of each CC through the relevant CC. In this case, the system information may be all pieces of system information of the CC2 250, the CC3 260 and the CC4 270, and may be a part of changed system information. The UE2 220 receives and acquires (②) system information or changed system information of the CC2 250 (SI CC2) through the CC2. The UE2 220 receives and acquires (③) system information of the CC3 260 (SI CC3) through the CC3. The UE2 220 receives and acquires (④) system information of the CC4 270 (SI CC4) through the CC4. When system information of each CC is changed, the UE2 220 receives and acquires the changed system information in the same manner as described above.

When system information of each CC is transmitted and received only through each CC as shown in FIG. 2, as compared with a conventional communication system, system information signaling overhead does not increase, and a scalability problem does not occur. On the other hand, in the case of discontinuous reception (DRX) and the like, paging information and the like related to the relevant CC must be received through the relevant CC. Accordingly, is a problem of wasting battery resources of a UE using the battery resources may occur.

Namely, in order to receive system information newly updated due to a change of system information and the like, the UE2 220 shown in FIG. 2 continuously monitors the CC2, the CC3 and the CC4, which are component carriers used by the UE2 220. After the UE2 220 detects that the system information has been newly updated, the UE2 220 must receive the changed system information of each relevant CC through each relevant CC. In this case, the power consumption of a battery of the UE2 220 may become significant.

Figure 3:
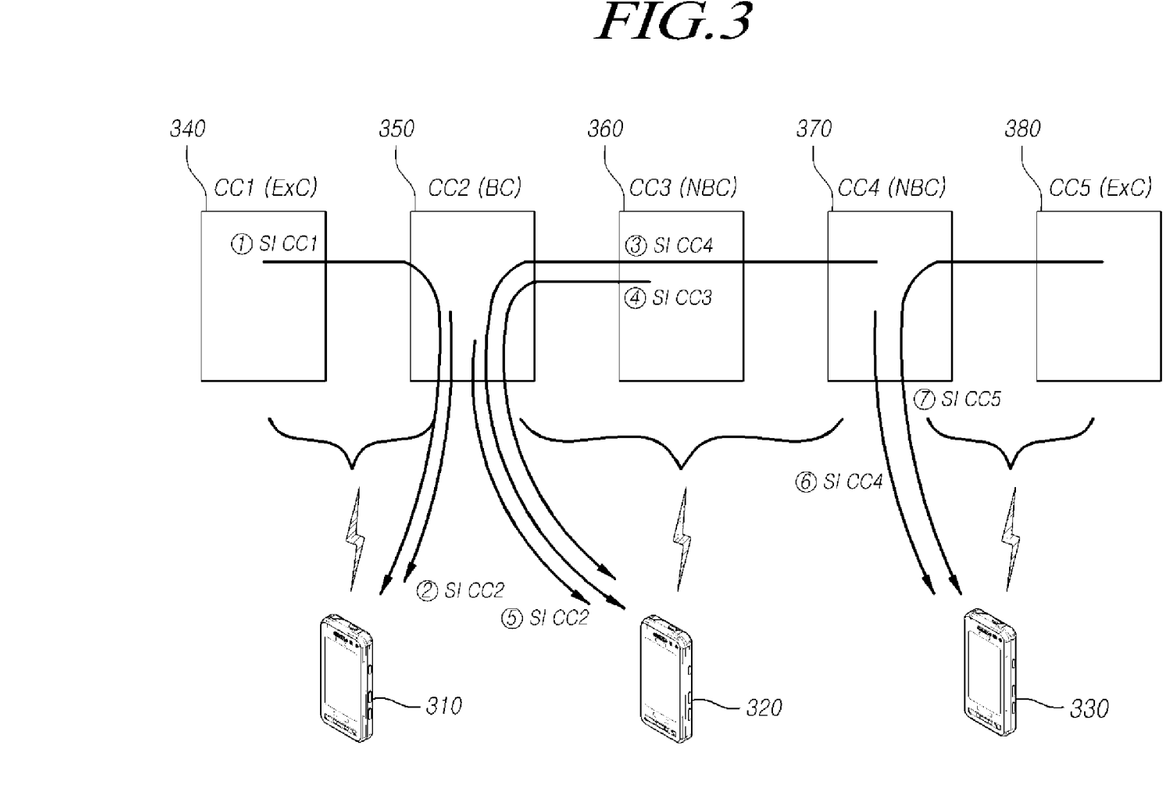
FIG. 3 is a view illustrating a scheme for transmitting system information according to an embodiment of the present invention.

In an exemplary embodiment as shown in FIG. 3, a scheme for transmitting changed system information of CCs to a UE by using a particular CC resource is used to deal with such a problem.

FIG. 3 illustrates a scheme for transmitting system information according to an embodiment of the present invention. In FIG. 3, changed system information of CCs is transmitted to a UE by using a particular CC resource, and is received by the UE.

In FIG. 3, as described above with reference to FIG. 2, a UE1 310 is in a state where it may transmit data through a CC1 340 and a CC2 350. A UE2 320 is in a state where it may transmit data through a CC2 350, a CC3 360 and a CC4 370. Also, a UE3 330 is in a state where it may transmit data through a CC4 370 and a CC5 380. It is assumed in FIG. 3 that the CC2 is a backwards compatible carrier (BC), each of the CC3 and the CC4 is a non-backwards compatible carrier (NBC), and each of the CC1 and the CC5 is an extension carrier (ExC).

Referring to FIG. 3, each of the UE1 310 and the UE2 320 makes a connection for signaling through the CC2 350, and the UE3 330 makes a connection for signaling through the CC4 370.

In this case, although a CC through which a connection is made for signaling, is called a special CC (or special cell), the present invention is not limited to this term.

The special CC may provide multiple pieces of information for a signaling connection to a UE. For example, the special CC (or special cell) may generate and provide a key for ensuring security between a system and the UE. Otherwise, the special CC may transmit mobility-related information and the like, which are generated and transmitted by a core network for ensuring mobility.

In the exemplary embodiment as shown in FIG. 3, differently from as shown in FIG. 2, system information of another allocated CC may be transmitted through the special component carrier which plays a role (e.g. signaling connection).

Namely, the UE2 320 detects changed contents of SI of the CC2 350, SI of the CC3 360 and SI of the CC4 370. Then, in order to receive SI of the relevant CC3 360 and SI of the relevant CC4 370, the UE2 320 does not need to receive the changed SI through the relevant CC, but may receive the changed SI of the CC3 360 and the changed SI of the CC4 370 through the CC2 350.

Otherwise, not only changed SI of a CC but also all pieces of system information for using the CC3 360, the CC4 370 and the like or a part thereof may be transmitted through the CC2 350, instead of through the relevant CC.

At this time, the transmitted SI is essential information that the UE2 320 must receive in order to use the relevant CC. The transmitted SI may be information independent of the relevant CC. Otherwise, the transmitted SI may be information other than a special CC.

For example, the transmitted SI may include information on a downlink (DL) carrier frequency (and an UL frequency which forms a pair with the DL carrier frequency), bandwidth (BW) information of the relevant CC, PCI information in a case where discrimination is made between CCs according to a Physical Cell ID (PCI), carrier index information, radio resource configuration information, temporary ID information, and the like. However the present invention is not limited to this configuration.

Although a signaling connection that a UE makes through a special CC, may be made through RRC (Radio Resource Control), the present invention is not limited to this configuration. Each UE receives and acquires system information of another CC through a special CC.

A more detailed description will be made below for each UE. Referring to FIG. 3, because the CC1 340 is an extension carrier (ExC) for the UE1, the UE1 310 may not directly receive system information of the CC1 340 (SI CC1) through the CC1 340. Instead, the UE1 310 transmits (①) system information of the CC1 through the CC2 350 which is not only a backwards compatible carrier (BC) but also a special CC for the UE1.

Namely, the CC2 350 may be used to transmit the system information of the CC1 340. Otherwise, when the system information of the CC1 340 is changed, the changed system information may be transmitted through the CC2 350. It goes without saying that system information or changed system information of the CC2 350 (SI CC2) is received (②) through the CC2 350 corresponding to a special CC.

Also, referring to FIG. 3, because the CC5 380 is an ExC for the UE3, the UE3 330 may not directly receive system information of the CC5 380 (SI CC5) through the CC5 380.

Meanwhile, because the CC4 370 is not only a non-backwards compatible carrier (NBC) but also a special CC for the UE3, the UE3 330 may receive system information of the CC5 380 corresponding to another CC, through the CC4 370 corresponding to the special CC. Otherwise, when system information of the CC5 380 is changed, the UE3 330 may receive (⑦) the changed system information through the CC4 370. It goes without saying that the UE3 330 receives (⑥) system information or changed system information of the CC4 370 (SI CC4) through the CC4 370 itself corresponding to a special CC.

Also, the UE2 320 not only receives (⑤) system information (SI CC2) of the CC2 350 corresponding to a special CC through the CC2 itself, but also receives (③④)) SI (SI CC3) of the CC3 360 corresponding to another CC and SI (SI CC4) of the CC4 370 corresponding to another CC, through the CC2 350 corresponding to a special CC which is not is the CC3 and the CC4.

Figure 4:
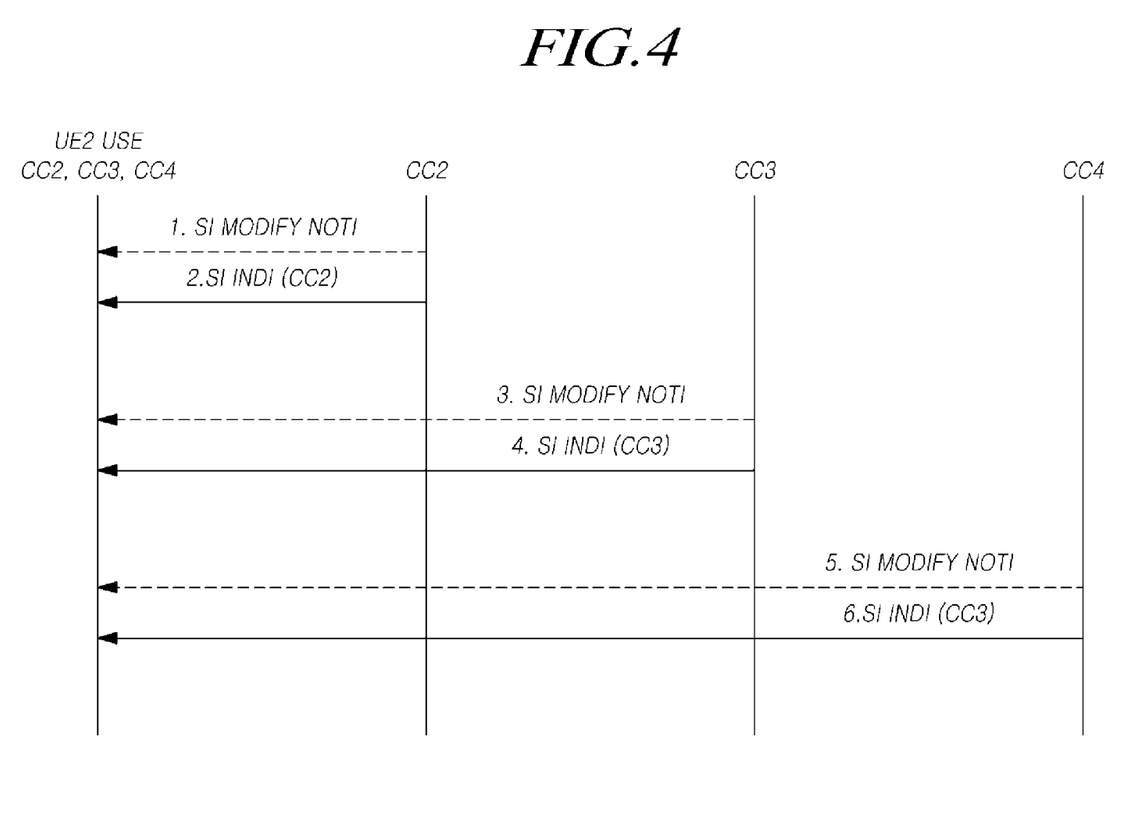
FIG. 4 is a signal flow diagram providing changed system information in a wireless communication system, to which an exemplary embodiment of the present invention is applied.

FIG. 4 is a signal flow diagram providing changed system information in a wireless communication system, to which an exemplary embodiment of the present invention is applied.

When system information of each CC is transmitted and received only through each CC as in FIG. 2, FIG. 4 illustrates a scheme for providing changed system information, and assumes the connection environment of the UE2 as shown in FIGS. 2 and 3.

As shown in FIG. 4, in a system where system information of each CC is transmitted and received only through each CC, the UE2 which is allocated three component carriers such as the CC2 (BC), the CC3 (NBC) and the CC4 (NBC), receives a signal such that system information of the CC2 has been changed, from a 1. SI Modify Notification (or 1. SI Modify Noti) message through the CC2. At this time, a 2. SI Indi (CC2) corresponding to a 2. SI indication message may include system information of the CC2. The system information may be changed information among multiple pieces of system information required by the CC2. Otherwise, the system information may be all pieces of system information required by the CC2.

When the 2. SI Indi (CC2) message simultaneously notifies a change of system information, the 1. SI Modify Noti message may not be used.

Also, after a change of system information of the CC3 is notified through a 3. SI Modify Noti message, system information of the CC3 is delivered through a 4. SI Indi (CC3) corresponding to a 4. SI Indi message. At this time, the system information may include changed information among multiple pieces of system information required by the CC3, or all pieces of system information required by the CC3. However, the present invention is not limited to this configuration. Also, when the 4. SI Indi message simultaneously notifies the change of the system information, the 3. SI Modify Noti message may not be used.

Similarly, after a change of system information of the CC4 is notified through a 5. SI Modify Noti message, system information of the CC4 is delivered through a 6. SI Indi (CC4) corresponding to a 6. SI Indi message. At this time, the system information may include changed information among multiple pieces of system information required by the CC4, or all pieces of system information required by the CC4. However, the present invention is not limited to this configuration. Also, when the 6. SI Indi message simultaneously notifies the change of the system information, the 5. SI Modify Noti message may not be used.

When the changed system information of each relevant CC is received through each relevant CC in this manner, the power consumption of a battery may become significant, as described above. In order to solve this problem, use may be made of a scheme for transmitting and receiving system information of a component carrier, as shown in FIG. 5 and FIG. 6.

Figure 5:
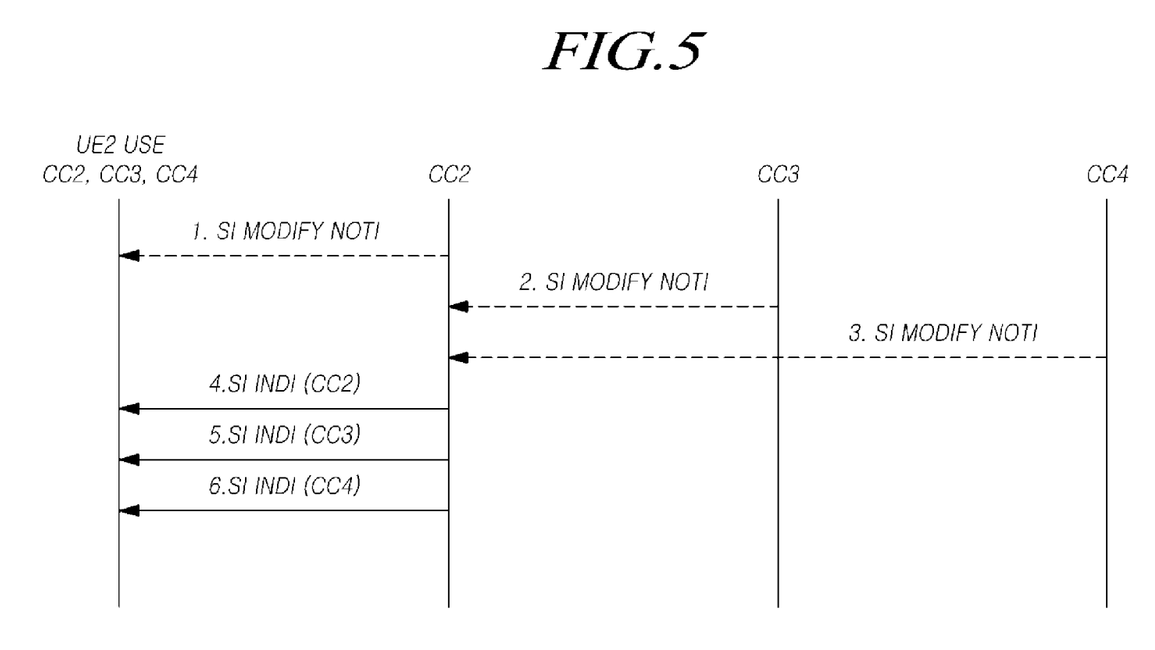
FIG. 5 is a view illustrating a signal flow delivering changed system information of a component carrier according to an embodiment of the present invention.
Figure 6:
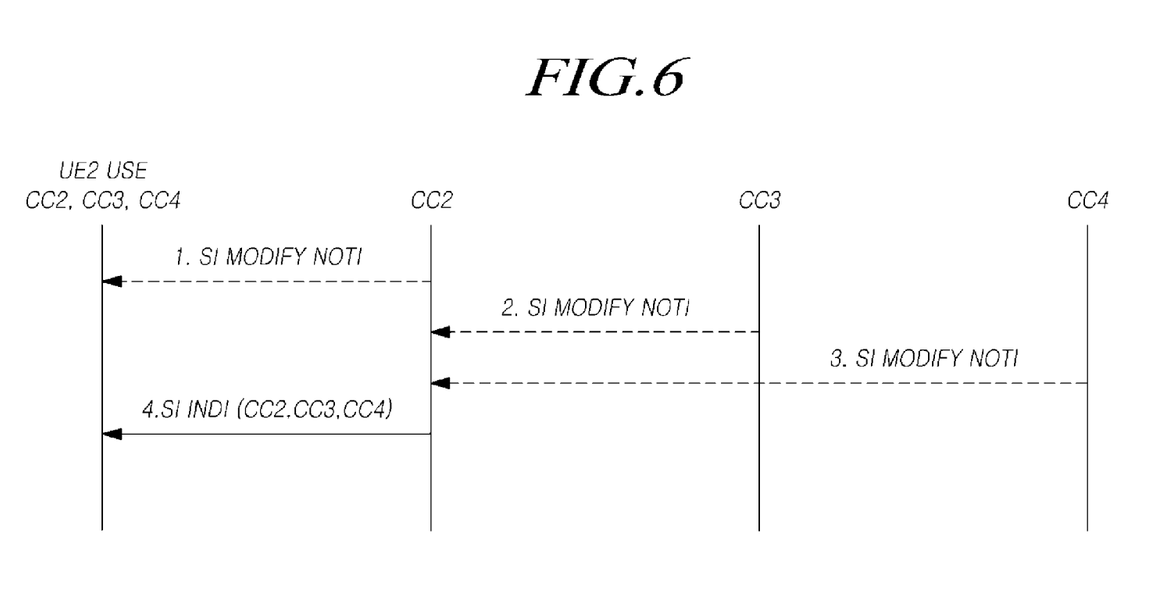
FIG. 6 is a view illustrating a signal flow delivering changed system information of a component carrier according to another embodiment of the present invention.

FIG. 5 is a view illustrating a signal flow delivering changed system information of a component carrier according to an embodiment of the present invention.

An embodiment as shown in FIG. 5 describes, for illustrative purposes, a is process where a UE transmits and receives multiple pieces of changed system information of all CCs through one CC. The UE2 is notified of a change of system information of the CC2, or a change of system information of the CC3, or a change of system information of the CC4 through the CC2 corresponding to a special CC.

Specifically, when one or more pieces of system information of one or more of the CC2, the CC3 and the CC4 which are allocated component carriers, are changed, a change of system information is notified to the UE through a 1. SI Modify Noti. Then, a change of system information of the CC3 and a change of system information of the CC4 are notified to a device for transmitting SI of the CC2 corresponding to a special CC, through a 2. SI Modify Noti and a 3. SI Modify Noti. The device for transmitting SI of the CC2 transmits changed system information of the CC2 (when it exists)

to the UE2 through a 4. SI Indi message. Then, the device for transmitting the SI of the CC2 transmits the changed SI of the CC3 corresponding to another CC and the changed SI of the CC4 corresponding to another CC to the UE2, through a 5. SI Indi message and a 6. SI Indi message, respectively.

Namely, in an embodiment as shown in FIG. 5, the UE2 is notified of the change of the SI of the CC2, or the change of the SI of the CC3, or the change of the SI of the CC4, through the CC2. Also, the 4. SI Indi message, the 5. SI Indi message and the 6. SI Indi message may include the SI of the relevant CC2, the SI of the relevant CC3 and the SI of the relevant CC4, respectively. Herein, the system information may be changed information among multiple pieces of system information required by the CC2, the CC3 and the CC4, or may be all pieces of system information required by the CC2, the CC3 and the CC4. When the 4. SI Indi message, the 5. SI Indi message and the 6. SI Indi message simultaneously notify the change of the SI of the CC2, the change of the SI of CC3 and the change of the SI of the CC4, respectively, the SI Modify Noti message may not be used. An embodiment as shown in FIG. 5 includes a case where a change of SI is notified through the CC2 and each of the SI Indi (CC3) message and the SI Indi (CC4) message is transmitted through the CC2.

The configuration of a SI transmission device such as a base station using a special CC will be described in more detail with reference to FIG. 7.

FIG. 6 is a view illustrating a signal flow delivering changed system information of a component carrier according to another embodiment of the present invention.

Another embodiment as shown in FIG. 6 describes, for illustrative purposes, a configuration in which a UE receives changed system information from one SI Indi message through one CC.

Specifically, when one or more pieces of system information of one or more of the CC2, the CC3 and the CC4 which are allocated component carriers, are changed, a change of system information is notified to the UE through a 1. SI Modify Noti. Then, a change of system information of the CC3 and a change of system information of the CC4 are notified to a SI transmission device of the CC2 corresponding to a special CC, through a 2. SI Modify Noti and a 3. SI Modify Noti. The SI transmission device of the CC2 simultaneously transmits changed SI of the CC2 (when it exists), and the changed SI of the CC3 corresponding to another CC and the changed SI the CC4 corresponding to another CC to the UE2, through a 4. SI Indi message corresponding to one message.

Namely, in another embodiment as shown in FIG. 6, the UE2 is notified of the change of the SI of the CC2, or the change of the SI of the CC3, or the change of the SI of the CC4, through the CC2. Then, the UE2 receives SI of the relevant CC2, SI of the relevant CC3 and SI of the relevant CC4 through the 4. SI Indi message corresponding to one message. The 4. SI Indi message may include all pieces of information or only a part of changed information among SI of the CC2, SI of the CC3 and SI of the CC4.

At this time, the system information may be changed information among multiple pieces of system information required by the CC2, the CC3 and the CC4, or may be all pieces of system information required by the CC2, the CC3 and the CC4. When the 4. SI Indi message simultaneously notifies the change of the SI of the CC2, the change of the SI of CC3 and the change of the SI of the CC4, the SI Modify Noti message may not be used.

In this specification, after a CC is first allocated to a UE and the UE acquires SI of the CC, the UE needs to continuously acquire updated up-to-date SI of the allocated CC. Important information elements of SI which may change over time, may include a PHICH (Physical Hybrid-ARQ Indicator CHannel) configuration (in a MIB), a radio resource configuration, a Common and MBSFN (Multi-Media Broadcast over a Single Frequency Network)-subframe configuration (in a SIB2), and the like. However, the present invention is not limited to this configuration. Another embodiment as shown in FIG. 6 includes a case where a change of SI is notified through the CC2 and one message, into which a SI Indi (CC2) message, a SI Indi (CC3) message and a SI Indi (CC4) message are combined, is transmitted through the CC2.

In the embodiments as described above, when there are multiple CCs, SI of each CC or changed SI is not transmitted to a UE through each CC, but multiple pieces of SI of all CCs are delivered to the UE through one CC (e.g. a special CC, through which a signaling connection is made). At this time, the multiple pieces of SI of all CCs may be sequentially transmitted to the UE through a special CC, or may be simultaneously delivered to the UE through one message.

Figure 7:
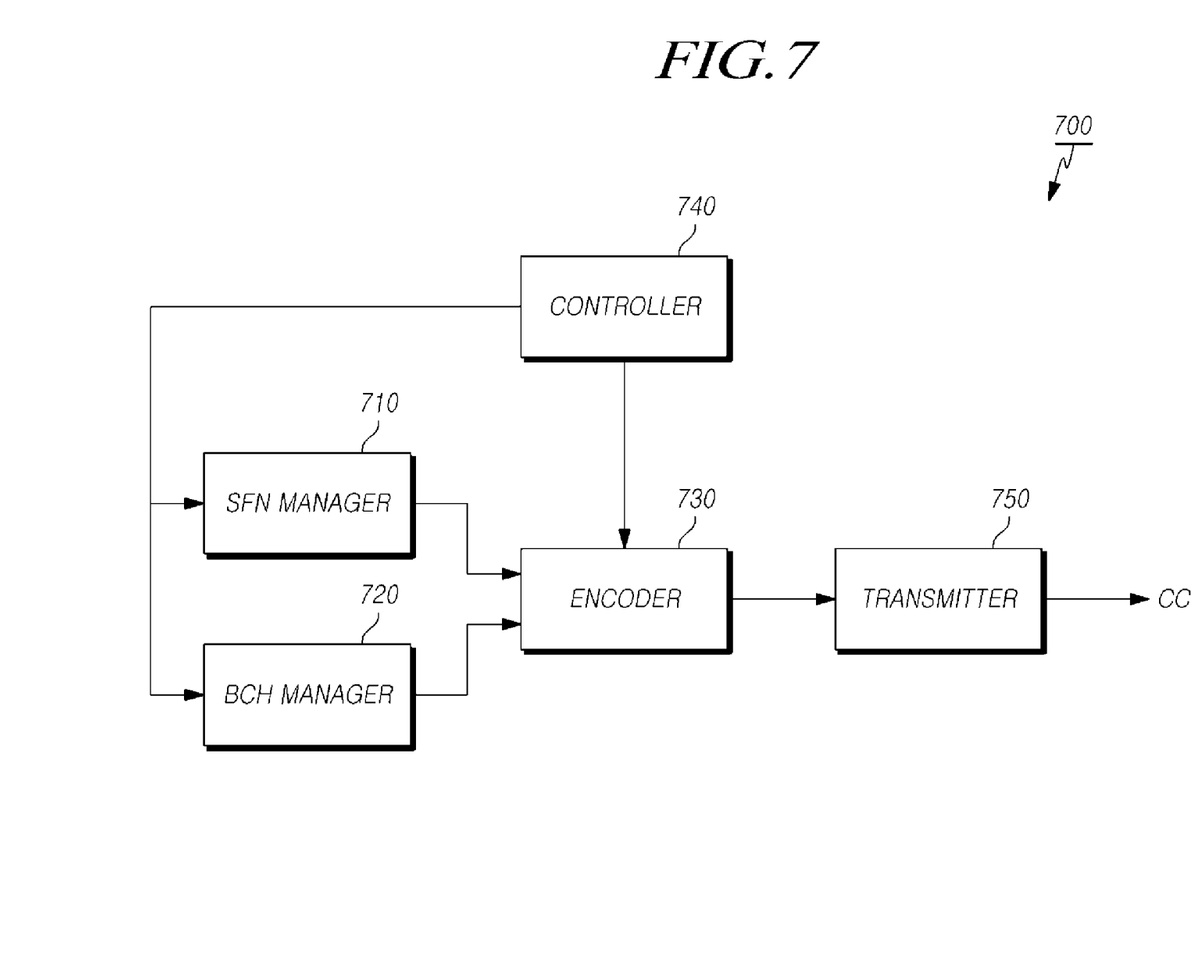
FIG. 7 is a block diagram illustrating the configuration of a SI (System is Information) transmission device for transmitting SI according to an embodiment of the present invention.

FIG. 7 is a block diagram illustrating the configuration of a SI (System Information) transmission device for transmitting SI according to an embodiment of the present invention.

A SI transmission device according to an embodiment of the present invention which is a device for transmitting system information of multiple component carriers, may transmit not only system information of a component carrier used by itself but also system information of another component carrier, to a UE. For example, the configuration as shown in FIG. 7 is an embodiment of a device which uses a first CC and a second CC and transmits the entire system information of the second CC or a part of changed system information thereof to the UE through the first CC.

A SI transmission device 700 includes an SFN (System Frame Number) manager 710, a BCH (Broadcast CHannel) manager 720, an encoder 730, a controller 740 and a transmitter 750, according to functions. However, the present invention is not limited to this configuration.

The SFN manager 710 which is a function unit for controlling and managing an SFN, increases an SFN in each radio frame. The SFN which is information included in system information, implies that information having a different value at every P-BCH (Public Broadcast CHannel) transmission cycle is discriminated from other pieces of P-BCH information, and the discriminated information is first separately encoded/repeated and is then transmitted through an agreed resource. However, the present invention is not limited to this configuration.

The BCH manager 720 which is a function unit for controlling and managing BCH information other than an SFN, first acquires SI of another CC as well as SI of itself and then transmits the acquired SI to the UE, particularly, according to an embodiment of the present invention.

Specifically, the BCH controller 720 included in a SI transmission device of a special CC (or special cell) through which the UE makes a signaling connection, may identify whether SI of another CC has been changed, and may transmit SI itself or changed SI of itself or SI itself or changed SI of another CC to the UE.

At this time, SI generated and transmitted by the BCH controller is all pieces of information required to transmit and receive data through the relevant CC. For example, the SI may include information on a downlink (DL) carrier frequency (and an UL frequency which forms a pair with the DL carrier frequency) of a relevant CC, bandwidth (BW) information of the relevant CC, PCI information in a case where discrimination is made between CCs according to a Physical Cell ID (PCI), carrier index information, radio resource configuration information, temporary ID information, and the like. However the present invention is not limited to this configuration.

The encoder 730 is a block which encodes an SFN and BCH information according to a predetermined encoding method and a predetermined coding rate, respectively.

The controller 740 adjusts a time point of transmitting information of each of the SFN manager 710 and the BCH manager 720, and adjusts an encoding method and a coding rate in the encoder 730.

The transmitter 750 transmits the SFNs and the multiple pieces of BCH information encoded by the encoder 730 to a cell.

Namely, the SI transmission device according to an exemplary embodiment of the present invention is implemented in a base station (eNB or cell), and operates in such a manner as to transmit the entire SI or changed SI of another CC to the UE. To this end, the SI transmission device has a function of receiving the entire SI or changed SI of another CC, a function of receiving a notification of a change of SI of another CC or monitoring the change of the SI, a function of transmitting the entire SI or changed SI of another CC to a UE, etc.

Accordingly, the present invention is not limited to the configuration shown in FIG. 7, and the configuration of the device and a scheme for implementing the device may be variously changed, as long as the functions as described above may be performed.

Figure 8:
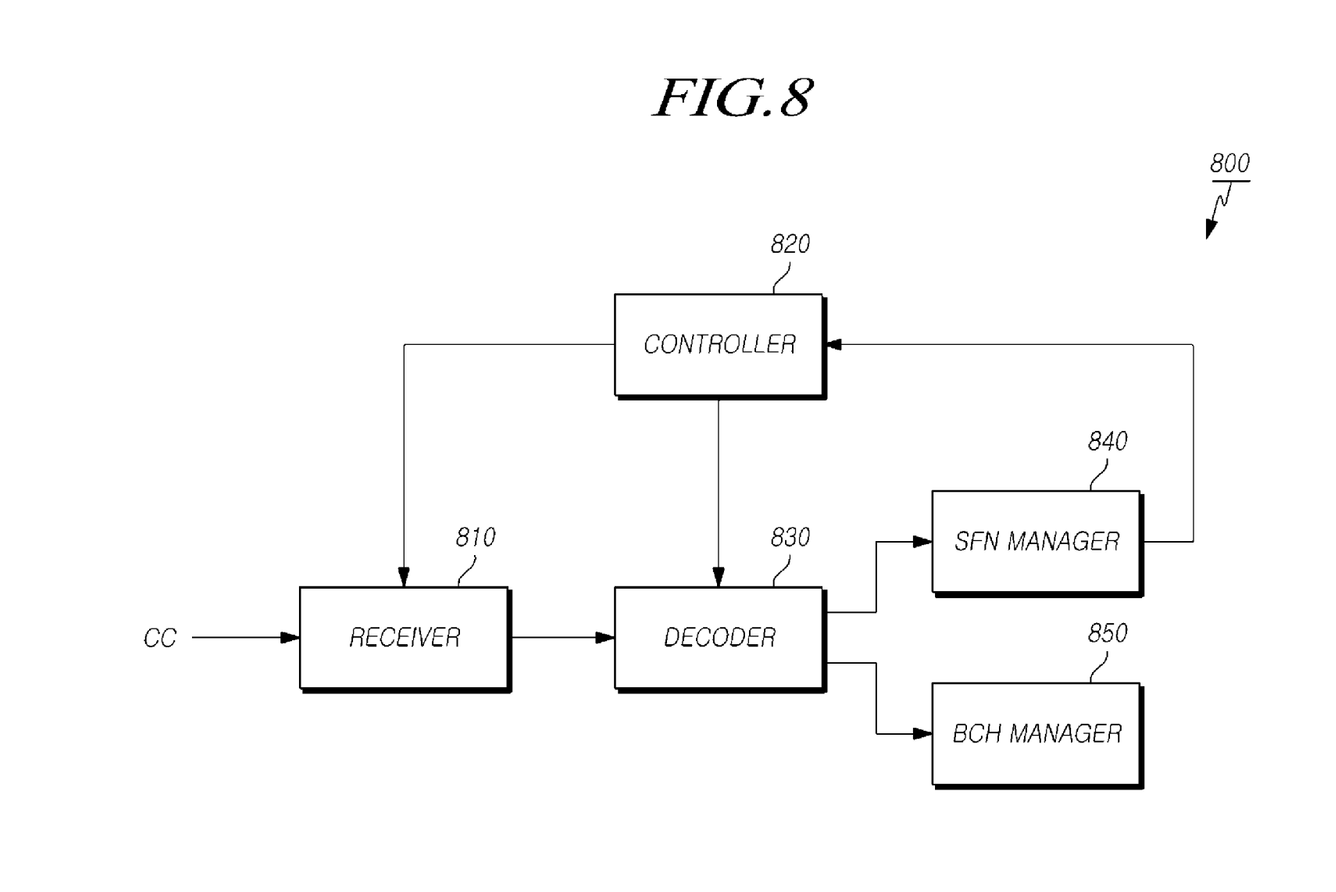
FIG. 8 is a block diagram illustrating the configuration of a device for receiving system information according to an embodiment of the present invention.

FIG. 8 is a block diagram illustrating the configuration of a device for receiving system information according to an embodiment of the present invention.

A device for receiving system information according to an embodiment of the present invention has a configuration for receiving and acquiring SI of a special CC and SI of another CC from the SI transmission device of the special CC through which a current signaling connection is made. For example, the configuration as shown in FIG. 8 is an embodiment of a UE which uses a first CC and a second CC and receives the entire system information of the second CC or a part of changed system information thereof through the first CC.

Although the device for receiving system information according to an embodiment of the present invention is mainly implemented in the UE, the present invention is not limited to this configuration. The device has a concept of including all communication-related devices for acquiring and using system information.

A device 800 for receiving system information as shown in FIG. 8 includes a receiver 810, a controller 820, a decoder 830, an SFN manager 840, and a BCH manager 850. However, the present invention is not limited to this configuration.

More specifically, the receiver 810 receives not only SI of the CC2 itself but also the entire SI or changed SI of the CC3 or CC4 corresponding to another CC, from the SI transmission device 700 of the CC2 corresponding to a special CC.

The controller 820 controls the application of a decoding method and a decoding rate to the multiple pieces of SI received through the receiver 810. At this time, the controller 820 may perform a control operation so as to apply different decoding methods and decoding rates to an SFN and BCH information other than the SFN.

The decoder 830 decodes the SFN information and the BCH information according to the control of the controller 820. Discrimination is first made between the SFN information and the BCH information which have been decoded by the decoder 830, and the decoded SFN information and the decoded BCH information are then separately input to the SFN manager 840 and the BCH manager 850, respectively. Then, the decoded SFN information and the decoded BCH information are managed and controlled by the SFN manager 840 and the BCH manager 850, respectively.

The SFN manager 840 identifies the continuity of the received SFNs, and may additionally receive SFNs of the next cycle under the control of the controller 820 according to the result of the identification.

When the BCH manager 850 has failed to successfully receive the BCH information, it first stores the received BCH information in a buffer, and then combines the read BCH information with BCH information received at the next cycle according to the control of the controller 820.

The BCH manager 850 of the device for receiving SI (i.e. the SI reception device) according to an embodiment of the present invention may identify SI of the special CC and SI of another CC based on SI received from the SI transmission device of a special CC (or special cell), and, particularly, may acquire changed SI of the special CC and changed SI of another CC. In this case, all pieces of the SI or the changed SI may include information on a downlink (DL) carrier frequency (and an UL frequency which forms a pair with the DL carrier frequency) of a relevant CC, bandwidth (BW) information of the relevant CC, PCI information in a case where discrimination is made between CCs according to a Physical Cell ID (PCI), carrier index information, radio resource configuration information, temporary ID information, and the like.

According to the exemplary embodiments of the present invention as described above, in carrier aggregation technology, in order to receive system information of multiple component carriers, and in order to receive system information and the like of a relevant component carrier, instead of receiving the relevant information through the multiple component carriers, a user equipment receives information of another component carrier through a particular component carrier among the multiple component carriers. Accordingly, solutions are given to problems, such as additional battery consumption and a delay time until the reception of information, occurring when multiple component carriers are used, so that battery consumption or information reception delay can be reduced.

Although it has been described in the above that all the components of an embodiment of the present invention are coupled as a single unit or coupled to be operated as a single unit, the present invention is not necessarily limited to such an embodiment. Namely, within the purpose of the present invention, one or more components among the components may be selectively coupled to be operated as one or more units. Also, although each of the components may be implemented as an independent hardware, some or all of the components may be selectively combined with each other, so that they may be implemented as a computer program having one or more program modules for performing some or all of the functions combined in one or more hardwares. Codes and code segments forming the computer program can be easily conceived by an ordinarily skilled person in the technical field of the present invention. Such a computer program may implement the embodiments of the present invention by being stored in a computer-readable medium, and being read and executed by the computer. Storage mediums for storing the computer program may include a magnetic recording medium, an optical recording medium, etc.

In addition, since terms, such as "including," "comprising," and "having" mean that one or more corresponding components may exist unless they are specifically described to the contrary, it shall be construed that one or more other components can be further included. All of the terminologies including one or more technical or scientific terminologies have the same meanings that those having ordinary knowledge in the technical field of the present invention understand ordinarily unless they are defined otherwise. A term ordinarily used like that defined by a dictionary shall be construed that it has a meaning equal to that in the context of a related description, and shall not be construed in an ideal or excessively formal meaning unless it is clearly defined in the present specification.

Although exemplary embodiments of the present invention have been described for illustrative purposes, those having ordinary knowledge in the technical field of the present invention will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the technical idea of the present invention is not limited by the embodiments. The protection scope of the present invention should be construed based on the accompanying claims, and all of the technical ideas included within the scope equivalent to the claims should be construed as being included within the right scope of the present invention.

The invention claimed is:

1. A method for transmitting system information in a wireless communication system supporting serving cells, the method comprising:
    identifying a change of system information of at least one serving cell configured for a user equipment;
    generating a radio resource control (RRC) message comprising the changed system information; and
    transmitting the generated radio resource control message to the user equipment through a special cell which is different from the at least one serving cell, wherein the special cell maintains connection with the user equipment for RRC signaling and transmits system information of the at least one serving cell.

2. The method as claimed in claim 1, wherein the radio resource control message comprises system information of the special cell and the changed system information of the serving cell.

3. The method as claimed in claim 1, wherein the changed system information comprises at least one of:
    a frequency of a downlink (DL) carrier, a frequency of an uplink (UL) carrier forming a pair with the DL carrier, bandwidth (BW) information, a physical cell identification (PCI), carrier index information, and radio resource configuration information.

4. The method as claimed in claim 1, further comprising changing an RRC connection with the user equipment through the radio resource control message, by a base station.

5. The method as claimed in claim 1, wherein the special cell is different from the at least one serving cell.

6. A method for receiving system information in a wireless communication system supporting serving cells, the method comprising:
    receiving, by a user equipment, a radio resource control (RRC) message comprising changed system information of at least one serving cell through a special cell which is different from the at least one serving cell, wherein the special cell maintains connection with the user equipment for RRC signaling and transmits system information of the at least one serving cell; and
    identifying a change of system information of the at least one serving cell configured for the user equipment through the received radio resource control message.

7. The method as claimed in claim 6, wherein the radio resource control message comprises system information of the special cell and the changed system information of the serving cell.

8. The method as claimed in claim 6, wherein the changed system information comprises at least one of:
    a frequency of a downlink (DL) carrier, a frequency of an uplink (UL) carrier forming a pair with the DL carrier, bandwidth (BW) information, a physical cell identification (PCI), carrier index information, and radio resource configuration information.

9. The method as claimed in claim 6, further comprising identifying the received radio resource control message and changing an RRC connection with the base station, by the user equipment.

10. The method as claimed in claim 6, wherein the special cell is different from the at least one serving cell.

11. A base station comprising an apparatus to transmit system information in a wireless communication system supporting serving cells, the base station comprising:
    a controller to identify a change of system information of at least one serving cell configured for a user equipment, and to generate a radio resource control (RRC) message comprising the changed system information; and
    a transmitter to transmit the generated radio resource control message to the user equipment through a special cell which is different from the at least one serving cell, wherein the special cell maintains connection with the user equipment for RRC signaling and transmits system information of the at least one serving cell.

12. The base station as claimed in claim 11, wherein the radio resource control message comprises system information of the special cell and the changed system information of the serving cell.

13. The base station as claimed in claim 11, wherein the changed system information comprises at least one of:
    a frequency of a downlink (DL) carrier, a frequency of an uplink (UL) carrier forming a pair with the DL carrier, bandwidth (BW) information, a physical cell identification (PCI), carrier index information, and radio resource configuration information.

14. The base station as claimed in claim 11, wherein the controller changes an RRC connection with the user equipment through the radio resource control message.

15. The base station as claimed in claim 11, wherein the special cell is different from the at least one serving cell.

16. A user equipment comprising an apparatus to receive system information in a wireless communication system supporting serving cells, the user equipment comprising:
    a receiver to receive a radio resource control (RRC) message comprising changed system information of at least one serving cell through a special cell which is different from the at least one serving cell, wherein the special cell maintains connection with the user equipment for RRC signaling and transmits system information of the at least one serving cell; and
    a controller to identify a change of system information of at least one serving cell configured for the user equipment through the received radio resource control message.

17. The user equipment as claimed in claim 16, wherein the radio resource control message comprises system information of the special cell and the changed system information of the serving cell.

18. The user equipment as claimed in claim 16, wherein the changed system information comprises at least one of:
    a frequency of a downlink (DL) carrier, a frequency of an uplink (UL) carrier forming a pair with the DL carrier, bandwidth (BW) information, a physical cell identification (PCI), carrier index information, and radio resource configuration information.

19. The user equipment as claimed in claim 16, wherein the user equipment identifies the received radio resource control message, and changes an RRC connection with the base station.

20. The user equipment as claimed in claim 16, wherein the special cell is different from the at least one serving cell.

* * * * *